US008694207B2

(12) United States Patent
Stuetzler et al.

(10) Patent No.: US 8,694,207 B2
(45) Date of Patent: Apr. 8, 2014

(54) VEHICLE DYNAMIC CONTROL SYSTEMS WITH CENTER OF GRAVITY COMPENSATION BASED ON CARGO INFORMATION

(75) Inventors: Frank-Juergen Stuetzler, South Lyon, MI (US); Jason Trombley, Metamora, MI (US)

(73) Assignee: Robert Bosch GmbH, Stuttgart (DE)

( * ) Notice: Subject to any disclaimer, the term of this patent is extended or adjusted under 35 U.S.C. 154(b) by 121 days.

(21) Appl. No.: 13/084,987

(22) Filed: Apr. 12, 2011

(65) Prior Publication Data

US 2012/0265401 A1 Oct. 18, 2012

(51) Int. Cl.
*B60G 17/016* (2006.01)
(52) U.S. Cl.
USPC .................................. 701/38; 701/48
(58) Field of Classification Search
USPC .................................. 701/38, 48, 36
See application file for complete search history.

(56) References Cited

U.S. PATENT DOCUMENTS

| | | | |
|---|---|---|---|
| 5,136,513 A * | 8/1992 | Sol et al. ................ | 701/124 |
| 6,330,501 B1 | 12/2001 | Breed et al. | |
| 7,363,116 B2 | 4/2008 | Flechtner et al. | |
| 7,561,951 B2 | 7/2009 | Rao et al. | |
| 7,644,799 B2 | 1/2010 | Friedman et al. | |
| 7,740,098 B2 | 6/2010 | Lich et al. | |

| | | | |
|---|---|---|---|
| 2002/0145333 A1 | 10/2002 | Faye | |
| 2006/0184299 A1* | 8/2006 | Wu et al. ................ | 701/45 |
| 2006/0253240 A1 | 11/2006 | Rao et al. | |

FOREIGN PATENT DOCUMENTS

| | | |
|---|---|---|
| EP | 1410977 | 4/2004 |
| JP | 2006211818 | 8/2006 |
| WO | 2005070728 | 8/2005 |
| WO | 2006129820 | 12/2006 |

OTHER PUBLICATIONS

Search Report from the European Patent Office for Application No. 12163828 dated Oct. 16, 2013 (4 pages).

* cited by examiner

*Primary Examiner* — Thomas Black
*Assistant Examiner* — Luke Huynh
(74) *Attorney, Agent, or Firm* — Michael Best & Friedrich LLP

(57) ABSTRACT

Methods, systems, and computer-readable medium containing instructions for controlling a vehicle. One system includes a plurality of sensors, an occupant restraint system, and a controller. The plurality of sensors are configured to sense operating parameters of the vehicle, and the occupant restraint system is configured to sense data about cargo located in the vehicle. The controller is configured to obtain the data about the cargo located in the vehicle, determine a control adjustment to account for an impact of the cargo on the vehicle's center of gravity based on the data about the cargo, and control the vehicle based on the control adjustment.

14 Claims, 6 Drawing Sheets

VEHICLE DYNAMIC CONTROL SYSTEMS WITH CENTER OF GRAVITY COMPENSATION BASED ON CARGO INFORMATION

BACKGROUND

Many vehicle control systems monitor operating parameters of a vehicle and then take or suggest corrective action if the vehicle's performance varies from a desired performance. For example, vehicle dynamic control systems, such as roll stability control systems, yaw stability control systems, vehicle rollover control systems, electronic stability control ("ESC") systems, and collision mitigation systems, monitor operating parameters of a vehicle to determine the stability and safety of a vehicle and take corrective actions as necessary. If, however, a parameter used by a vehicle dynamic control system changes, but the control system continues to use the out-of-date parameter, the control system may take or suggest inappropriate corrective actions.

For example, the position of the vehicle's center of gravity ("CoG") is used in many vehicle dynamic control systems, such as ESC systems. Many control systems use a constant value for the CoG. The real position of a vehicle's CoG, however, varies depending on the weight, size, and position of cargo located in the vehicle, including the driver, other occupants, and other objects or freight in the vehicle. For example, for vehicles with a high CoG (e.g., sport utility vehicles or other tall vehicles) or with a relatively soft suspension, the weight, size, and location of cargo in a vehicle may substantially impact the vehicle's CoG, which can impact proper vehicle control. For example, the characteristic velocity of a vehicle, which represents the vehicle's steady state dynamics, can vary depending on the precise location of the vehicle's CoG. When the vehicle's CoG is not on the longitudinal geometrical center line of the vehicle, vehicle dynamic control systems should respond differently for left turns than for right turns to ensure vehicle stability. However, dynamically evaluating differences in the characteristic velocity for left and right turns based on changes to the CoG can involve complex logic that may assume very specific driving conditions.

SUMMARY

Embodiments of the invention relate to compensating for changes to a center of gravity ("CoG") of a vehicle caused of the presence of cargo in the vehicle (e.g., the driver, other occupants, or other objects or freight). Specifically, the invention relates to methods and systems for controlling a vehicle (e.g., with a vehicle dynamic control system) while taking into account the impact of cargo objects located in the vehicle on the vehicle's CoG.

In one embodiment, the invention provides a control system for a vehicle. The system includes a plurality of sensors, an occupant restraint system, and a controller. The plurality of sensors are configured to sense operating parameters of the vehicle, and the occupant restraint system is configured to sense data about cargo located in the vehicle. The controller is configured to obtain the operating parameters and the data about the cargo located in the vehicle, determine a control adjustment to account for an impact of the cargo on the vehicle's center of gravity based on the data about the cargo, and control the vehicle based on the control adjustment and the operating parameters.

The invention also provides a computer-implemented method for controlling a vehicle. The method includes obtaining, at a controller, operating parameters of the vehicle sensed by a plurality of sensors and data about cargo located in the vehicle sensed by an occupant restraint system. The method also includes determining, at the controller, a control adjustment to account for an impact of the cargo on the vehicle's center of gravity based on the data about the cargo, and controlling, at the controller, the vehicle based on the control adjustment and the operating parameters.

In yet another embodiment, the invention provides non-transitory computer-readable medium encoded with instructions for controlling a vehicle. The instructions include obtaining operating parameters of the vehicle sensed by a plurality of sensors and data about a weight of cargo located in the vehicle, determining a control adjustment to account for an impact of the weight of the cargo on the vehicle's center of gravity, and controlling the vehicle based on the control adjustment and the operating parameters.

Other aspects of the invention will become apparent by consideration of the detailed description and accompanying drawings.

DETAILED DESCRIPTION

Figure 1:
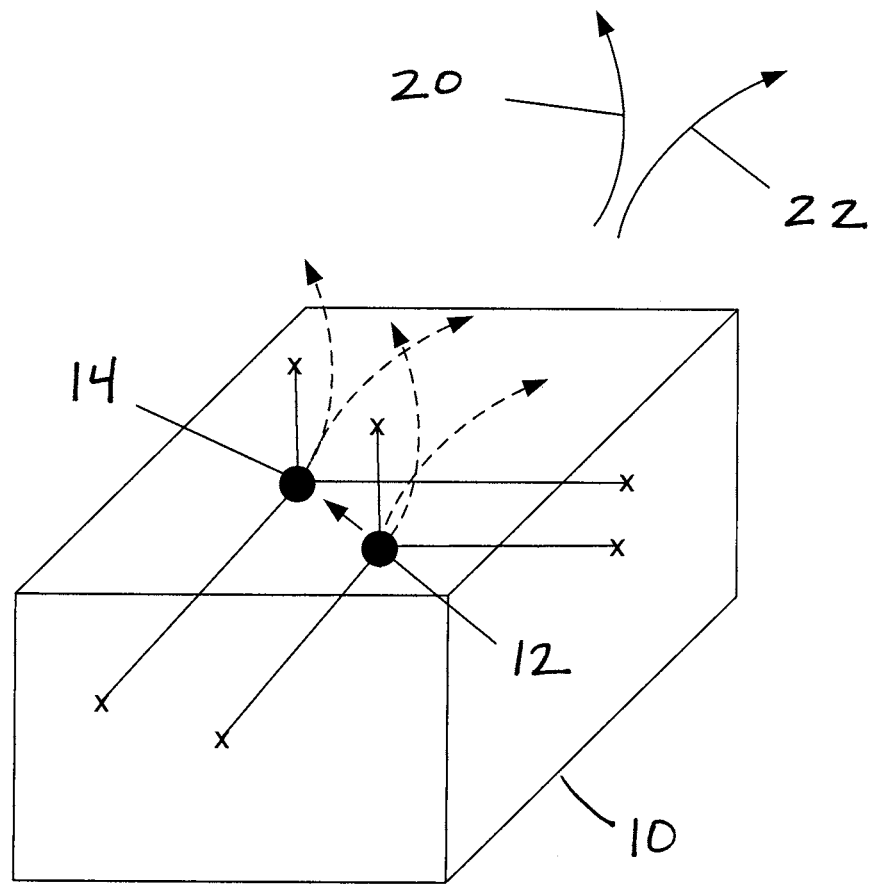
FIG. 1 schematically illustrates a first and a second center of gravity of a vehicle.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components, may be utilized to implement the invention. As described in subsequent paragraphs, the specific configurations illustrated in the drawings are intended to exemplify embodiments of the invention and other alternative configurations are possible.

As described above, the center of gravity ("CoG") of a vehicle changes based on the loading and unloading of cargo, such as the driver, occupants, or other objects or freight, into and out of the vehicle. Also, the location of a vehicle's CoG plays an important role in vehicle dynamic control systems, especially in critical driving situations. For example, FIG. 1 schematically illustrates a vehicle 10. When a driver and a passenger are located in the vehicle 10, the vehicle 10 has a first CoG 12 located toward the center of the vehicle. However, if only a driver is located in the vehicle 10, the vehicle 10 has a second CoG 14 located closer to the side of the vehicle where the driver is sitting. As also shown in FIG. 1, the first CoG 12 and the second CoG 14 travel on different paths during a left turn 20 or a right turn 22. Therefore, if a vehicle dynamic control system, such as an electronic stability control ("ESC") system, is basing its control on the first CoG 12 even when only a driver is located in the vehicle 10, the ESC system may ineffectively control the vehicle resulting in dangerous driving situations. In addition, the location of the vehicle's CoG plays a role in various vehicle responses to driver inputs as well as vehicle responses to certain sensed data. For example, a vehicle may respond differently to sensed lateral acceleration or yaw rate depending on where the sensors are mounted in the vehicle in relation to the vehicle's CoG. Accordingly, using an inaccurate CoG inhibits vehicle dynamic control systems from adequately controlling a vehicle to ensure vehicle safety and stability.

Figure 2:
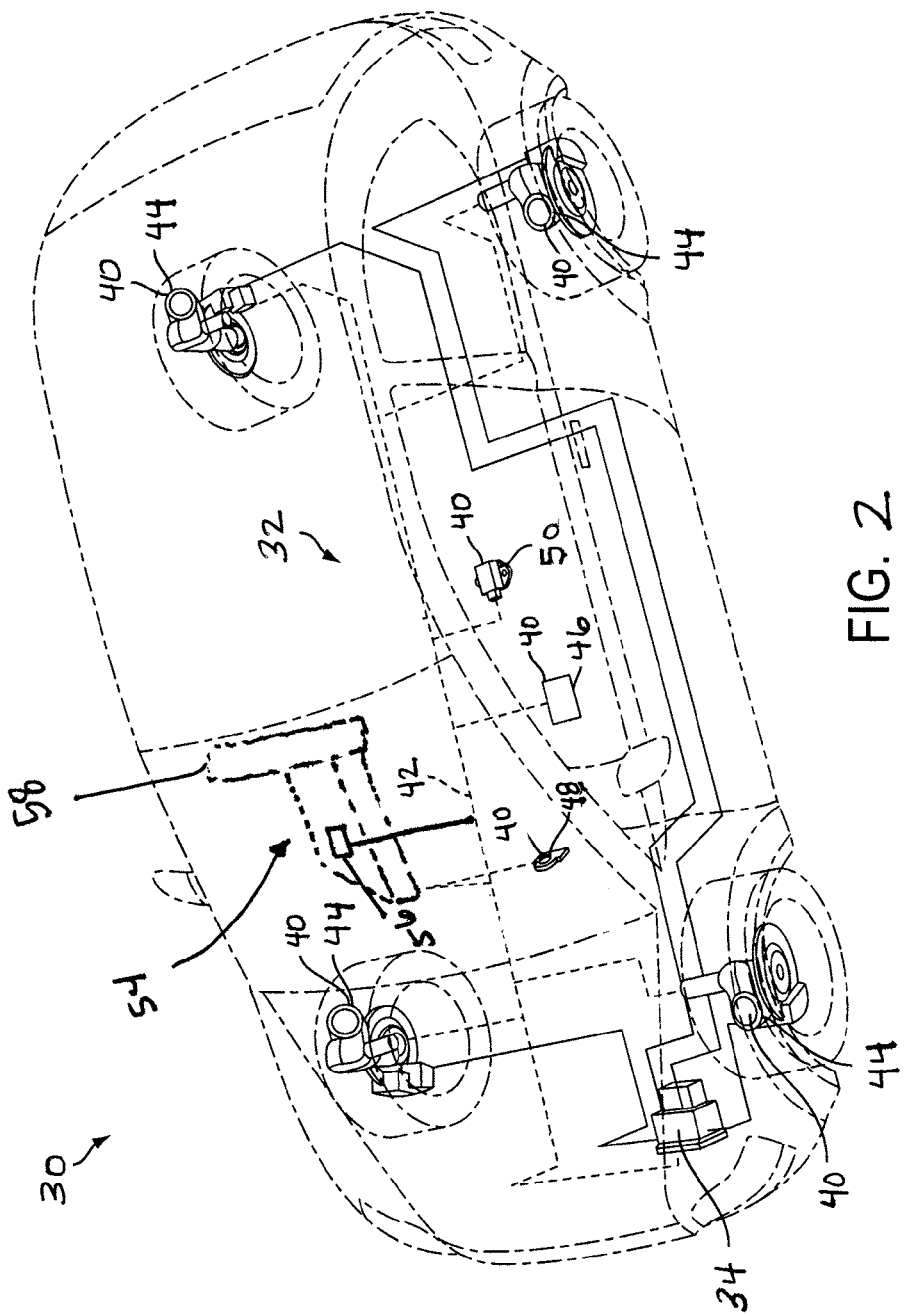
FIG. 2 schematically illustrates a vehicle including a vehicle dynamic control system.

FIG. 2 illustrates a vehicle 30 including a vehicle dynamic control system 32 according to one embodiment of the invention. As shown in FIG. 2, the vehicle dynamic control system 32 includes a controller 34 and a plurality of different types of sensors. In FIG. 2, each sensor is labeled with the reference numeral 40 as well as a second reference numeral. The second reference numerals, which are described in more detail below, provide a specific label to differentiate various types of sensors from one another. The sensors 40 are connected to a network, such as a controller area network ("CAN") bus 42. In the embodiment of FIG. 2, the system 32 includes four wheel speed sensors ("WSSs") 44. The wheel speed sensors 44 detect the speeds of each wheel of the vehicle 30, and transmit an indication of the wheel speeds to the controller 34. The system 32 also includes a lateral acceleration sensor ("LAS") 46, a steering angle sensor ("SAS") 48, and a yaw rate sensor ("YRS") 50. The LAS 46 detects a lateral acceleration (which includes deceleration) of the vehicle 30, and provides an indication of the acceleration to the controller 34. The SAS 48 detects an angle an operator has turned a steering wheel, indicating a direction the operator wishes the vehicle to travel. The SAS 48 transmits an indication of the steering angle to the controller 34. Likewise, the YRS 50 detects a yaw rate of the vehicle and provides an indication of the yaw rate to the controller 34. It should be understood that in some embodiments other types of sensors 40 can be included in the system 32. In addition, the arrangement and positions of the sensors 40 shown in FIG. 2 is for illustrative purposes only. Also, in some embodiments, one or more of the sensors 40 can be included in the controller 34.

The system 32 also includes an occupant restraint system ("ORS") 54. As shown in FIG. 2, the occupant restraint system 54 includes one or more weight and/or position sensors 56 that detect cargo located within the vehicle, such as a driver, other occupants, and other objects or freight. In some embodiments, the weight and/or position sensors 56 are positioned within or beneath one or more seats 58 of the vehicle 30. The weight and/or positions sensors 56 can also be positioned in other locations in the vehicle to detect the presence of cargo, such as in the trunk or on the floor of the vehicle 30. The occupant restraint system 54 uses the weight and/or position sensors 56 to determine the position of cargo in the vehicle and data about the cargo, such as its weight and/or height. Based on this data, the occupant restraint system 54 takes various actions to ensure that cargo placed in the vehicle are properly restrained and protected. For example, if the weight and/or positions sensors 56 indicate that cargo is positioned on a seat 58 and has a weight above a particular threshold, the occupant restraint system 54 can assume that an occupant is positioned in the seat 58 and can enable one or more airbags associated with the seat 58. Similarly, the occupant restraint system 54 can disable one or more airbags associated with a seat 58 if cargo placed in the seat has a weight below a particular threshold (e.g., for children sitting in the seat). The occupant restraint system 54 can also issuing warnings if cargo placed in a seat 58 are not properly restrained using a safety belt.

Figure 3:
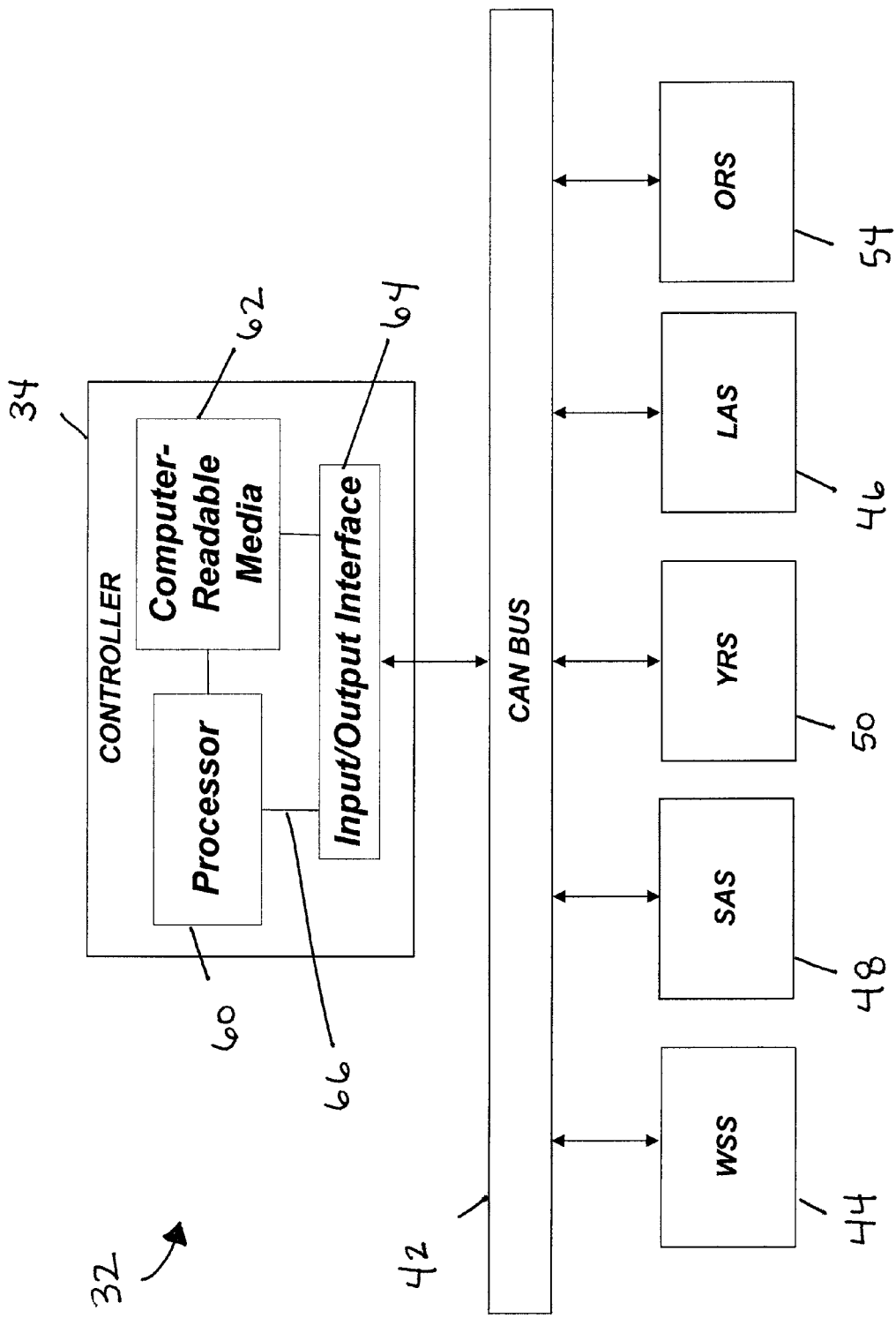
FIG. 3 schematically illustrates the vehicle dynamic control system of FIG. 2

FIG. 3 illustrates the vehicle dynamic control system 32 in more detail. As shown in FIG. 3, the controller 34 includes at least one processor 60, computer-readable media 62, and an input/output interface 64. The processor 60, computer-readable media 62, and input/output interface 64 are connected by one or more connections 66, such as a system bus. It should be understood that although only one processor 60, computer-readable media module 62, and input/output interface 64 are illustrated in FIG. 3, the controller 34 can include multiple processors 60, computer-readable media modules 62, and/or input/output interfaces 64.

The processor 60 retrieves and executes instructions stored in the computer-readable media 62 and stores data to the computer-readable media 62. The computer-readable media 62 includes volatile memory, non-volatile memory, or a combination thereof. The computer-readable media 62 also includes non-transitory computer-readable medium. The input/output interface 64 receives data from outside the controller 34 and outputs data outside the controller 34. The input/output interface 64 can communicate with other components inside the vehicle 30 (e.g., over a CAN) and outside of the vehicle 30. For example, the input/output interface 64 can include a network interface, such as an Ethernet card or a wireless network card, which allows the controller 34 to send and receive data over a network, such as a local area network or the Internet.

Figure 4:
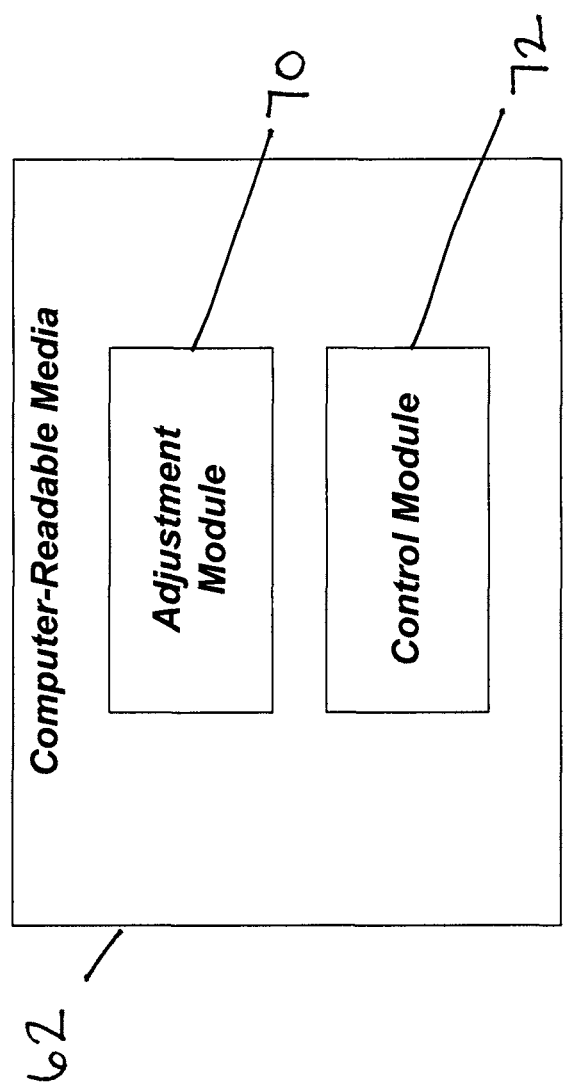
FIG. 4 schematically illustrates computer-readable medium included in the vehicle dynamic control system of FIG. 2.

The instructions stored in the computer-readable media 62 include various modules configured to perform particular functionality when executed by the processor 60. FIG. 4 schematically illustrates the computer-readable media 62 according to one embodiment of the invention. As shown in FIG. 4, the computer-readable media 62 includes an adjustment module 70 and a control module 72. It should be understood that the functionality provided by the modules illustrated in FIG. 4 can be combined into fewer modules or distributed among additional modules. For example, in some embodiments, the controller 34 includes additional modules, such as a brake control module (not shown) that controls the vehicle's brakes. Also, in some embodiments, the control module is located external to the controller 34. The external control module can operate similar to the internal control module 72 as described below but can communicate with the adjustment module 70 through the input/output interface 64.

Figure 5:
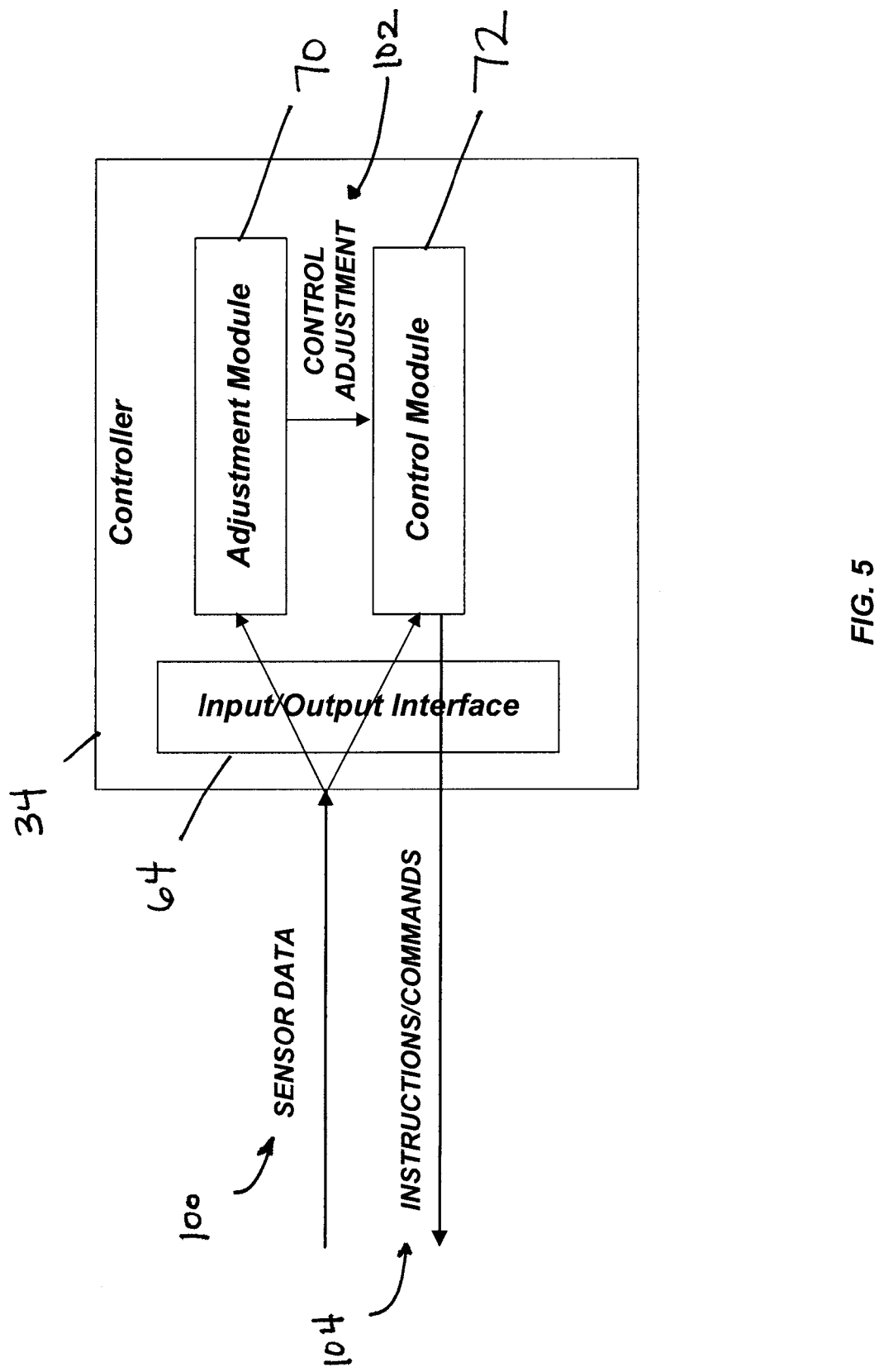
FIG. 5 schematically illustrates operation of the vehicle dynamic control system of FIG. 2.

As shown in FIG. 5, the adjustment module 70 obtains sensor data 100 from one or more of the sensors 40 and from the occupant restraint system 54. The sensor data includes operating parameters of the vehicle sensed by the sensors 40 and data about cargo located in the vehicle sensed by the occupant restraint system 54. For example, the data about the cargo located in the vehicle can include the position, height, and/or weight of individual cargo located in the vehicle, the total weight of all cargo located in the vehicle, or a combination thereof. The adjustment module 70 uses the data about the cargo to determine one or more control adjustments 102 to account for the impact of the cargo on the vehicle's CoG. As described in more detail below, the control adjustments 102 can include an adjusted CoG, adjusted vehicle parameters or correction or adjustment factors for vehicle parameters used by the control module 72, instructions or commands for the control module 72, or a combination thereof. The adjustment module 70 transmits the control adjustments 102 to the control module 72. The adjustment module 70 can also transmit the control adjustments 102 to other modules included in the controller 34 or other modules or systems external to the controller 34 (e.g., through the input/output interface 64).

The control module 72 obtains the sensor data 100 and the control adjustments 102 and uses the data 100 and the adjustments 102 to control the vehicle 30. For example, the control module 72 controls one or more components of the vehicle, such as the vehicle's speed, brakes, steering direction, etc. to maintain the vehicle in a safe and steady state. Therefore, the control module 72 uses the sensor data 100 and the control adjustments 102 to control at least one aspect of the vehicle while taking into account the cargo's impact on the vehicle's CoG. For example, based solely on the sensor data 100, the control module 72 may determine that the vehicle 30 can safely maneuver a particular turn and, therefore, may not take any corrective action. However, based on the control adjustments 102, the control module 72 may determine that the vehicle's current CoG (as impacted by the cargo in the vehicle) makes the turn unsafe or unstable and, therefore, may engage the vehicle's brakes to slow down the vehicle 30 to a safe speed. To control the vehicle, the control module 72 transmits instructions or commands 104 to one or more vehicle components (e.g., brakes, engine, etc.), systems (e.g., an ESC system), or module (e.g., a brake control module) instructing the components, systems, or modules to perform corrective action to maintain the vehicle's safety and stability. The corrective action can include overriding driver input (e.g., slowing down the vehicle 30 although the driver is applying the accelerator), issues warnings or alerts to the drivers, or a combination thereof.

In some embodiments, to determine the control adjustments, the adjustment module 70 is preprogrammed with a starting or default CoG and the adjustment module 70 determines an adjusted CoG based on the data received from the occupant restraint system 54 and the default CoG. In other embodiments, the adjustment module 70 (or other modules included in the controller 34) is configured to directly calculate a current, adjusted CoG for the vehicle based on data received from the occupant restraint system 54 and data received from the sensors 40. In still other embodiments, the adjustment module 70 can determine a correction or adjustment factor for one or more parameters used by the control module 72 to control the vehicle.

For example, the control module 72 may use a characteristic value ($v_{ch}$) for the vehicle 30. The characteristic velocity value ($v_{ch}$) represents the vehicle's steady state dynamics, which can be calculated using known methods. The control module 72 uses the characteristic velocity value ($v_{ch}$) to determine a desired vehicle yaw rate for the driver's current steering motion. Therefore, the control module 72 obtains operating parameters sensed by the sensors 40 (e.g., the wheel speed sensors 44, steering angle sensor 48, yaw rate sensor 50, and lateral acceleration sensor 46) and uses the operating parameters and the characteristic velocity value ($v_{ch}$) to determine how to control the vehicle to keep the vehicle stable. However, as described above, the characteristic velocity value ($v_{ch}$) varies for both left turns and right turns depending on the vehicle's current CoG.

Figure 6:
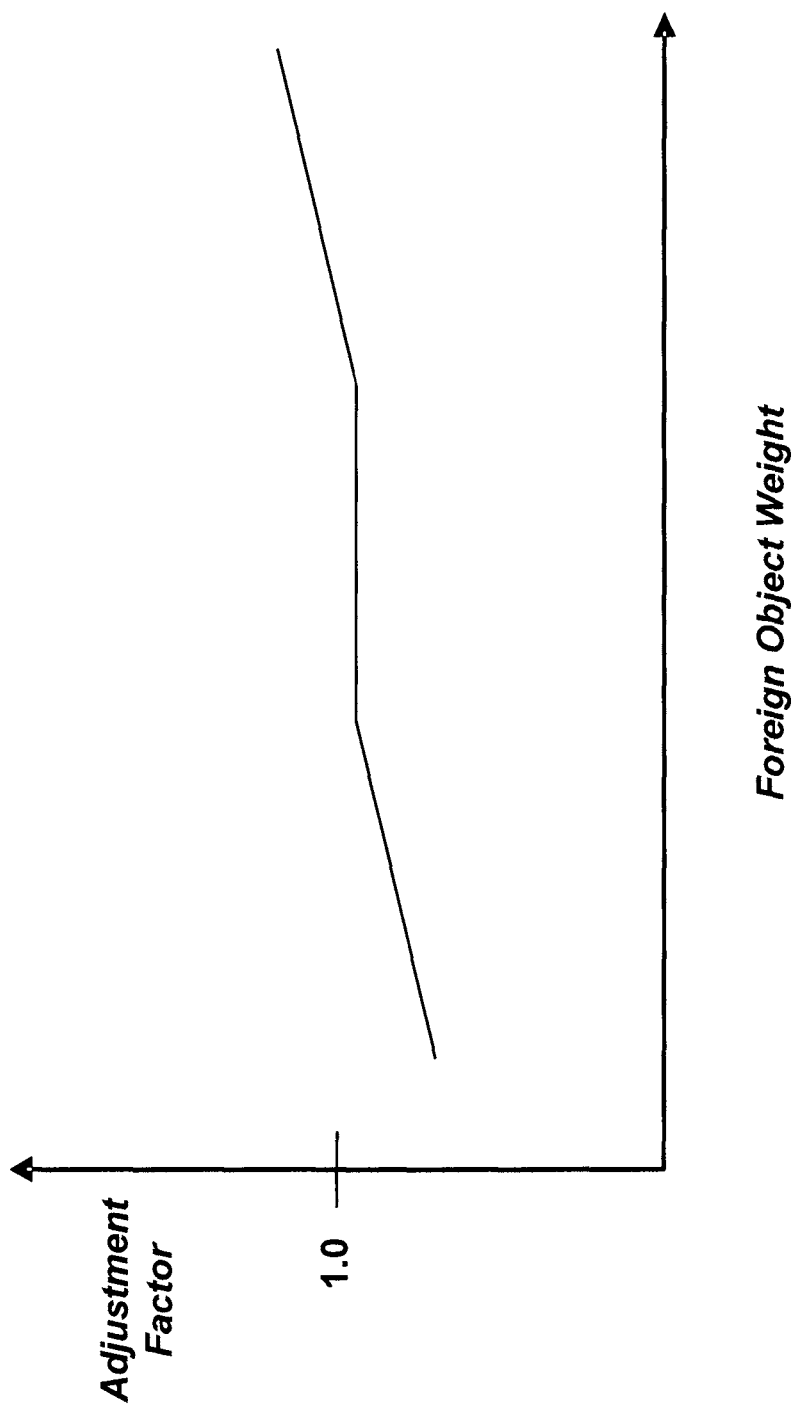
FIG. 6 illustrates a weight-dependent graph for determining an adjustment factor for a characteristic velocity of a vehicle.

Accordingly, using the data transmitted by the occupant restraint system 54, the adjustment module 70 can generate a control adjustment that includes an adjustment factor for the characteristic velocity value ($v_{ch}$) based on the weight of the cargo located in the vehicle. For example, the adjustment module 70 can use a weight-dependent graph, such as the table illustrated in FIG. 6, that provides an adjustment factor for the characteristic velocity value ($v_{ch}$) for different weights of the cargo. The adjustment module 70 can also use other methods to determine an adjustment factor, such as a look-up table or an equation. Other data about the cargo, such as position or height, can also be taken into account when determining an adjustment factor. For example, if all of the weight of the cargo is located on one side of the vehicle, the adjustment factor may be different for left turns than for right turns. Also, the adjustment module 70 can use operating parameters sensed by the sensors 40 to determine an adjustment factor for the characteristic velocity. For example, if the vehicle is traveling at a speed above a predetermined threshold (e.g., as sensed by the wheel speed sensors 44), the adjustment module 70 may increase the adjustment factor for the characteristic velocity.

The control module 72 (and/or the adjustment module 70) uses the adjustment factor to determine adjusted or corrected characteristic velocity values ($v_{ch,\ corrected}$) using the following equations:

$$v_{ch, corrected\ for\ left\ turns} = v_{ch} - (1 - \text{correction\_factor}) * v_{ch}$$

$$v_{ch, corrected\ for\ right\ turns} = v_{ch} - (1 + \text{correction\_factor}) * v_{ch}$$

As described above, the control module 72 uses the corrected characteristic velocity values ($v_{ch,\ corrected}$) to determine a desired yaw rate for the vehicle 30. Once the control module 72 determines the desired yaw rate for the vehicle 30, the module 72 uses the yaw rate and operating parameters sensed by the sensors 40 to control the vehicle 30.

In some embodiments, the adjustment module 70 determines a new adjustment factor for the characteristic velocity value ($v_{ch}$) at predetermined intervals or on a substantially continuous basis. Also, the adjustment module 70 can determine an adjustment factor for the characteristic velocity value ($v_{ch}$) after certain events have occurred, such as after the ignition is started, after a vehicle door has been closed, after data transmitted from the occupant restraint system 54 indicates a change in cargo in the vehicle 30, etc.

Thus, the invention provides, among other things, methods and systems for using data about cargo in a vehicle (e.g., position, weight, height, etc.) to modify vehicle control. Various features and advantages of the invention are set forth in the following claims.

What is claimed is:

1. A control system for a vehicle, the system comprising:
a plurality of sensors configured to sense operating parameters of the vehicle;
an occupant restraint system configured to sense data about cargo located in the vehicle;
a controller configured to obtain the data about the cargo located in the vehicle and the operating parameters, determine a control adjustment to account for an impact of the cargo on the vehicle's center of gravity based on the data about the cargo, and control the vehicle based on the control adjustment and the operating parameters, wherein the control adjustment includes an adjusted center of gravity for the vehicle.

2. The control system of claim 1, wherein the data about the cargo located in the vehicle includes a weight of the cargo.

3. The control system of claim 2, wherein the control adjustment includes an adjustment factor for a characteristic velocity value for the vehicle based on the weight of the cargo.

4. The control system of claim 3, wherein the controller is configured to control the vehicle by determining a corrected characteristic velocity value based on the adjustment factor.

5. The control system of claim 4, wherein the controller is configured to control the vehicle by determining a desired yaw rate for the vehicle based on the corrected characteristic velocity value.

6. The control system of claim 1, wherein the data about the cargo located in the vehicle includes a position of the cargo.

7. The control system of claim 1, wherein the data about the cargo located in the vehicle includes a height of the cargo.

8. The control system of claim 1, wherein the controller is configured to control the vehicle by sending instructions to at least one component included in the vehicle.

9. The control system of claim 1, wherein the plurality of sensors include at least two of a wheel speed sensors, a steering angle sensor, a yaw rate sensors, and a lateral acceleration sensor.

10. Non-transitory computer-readable medium encoded with instructions for controlling a vehicle, the instructions comprising:
   obtaining operating parameters of the vehicle sensed by a plurality of sensors;
   obtaining data about a weight of cargo located in the vehicle;
   determining a control adjustment to account for an impact of the weight of the cargo on the vehicle's center of gravity based on the weight of the cargo, wherein the control adjustment includes an adjusted center of gravity for the vehicle; and
   controlling the vehicle based on the control adjustment and the operating parameters.

11. A computer-implemented method for controlling a vehicle, the method comprising:
   obtaining, at a controller, operating parameters of the vehicle sensed by a plurality of sensors;
   obtaining, at the controller, data about cargo located in the vehicle sensed by an occupant restraint system;
   determining, at the controller, a control adjustment to account for an impact of the cargo on the vehicle's center of gravity based on the data about the cargo, wherein the control adjustment includes an adjusted center of gravity for the vehicle; and
   controlling, at the controller, the vehicle based on the control adjustment and the operating parameters.

12. The method of claim 11, wherein obtaining data about the cargo includes obtaining a total weight for the cargo.

13. The method of claim 12, wherein determining a control adjustment includes determining an adjustment factor for a characteristic velocity value for the vehicle based on the total weight of the cargo.

14. The method of claim 13, wherein controlling the vehicle includes determining a corrected characteristic velocity value based on the adjustment factor.

* * * * *